United States Patent [19]
Debortoli et al.

[11] Patent Number: 5,596,670
[45] Date of Patent: Jan. 21, 1997

[54] OPTICAL FIBER CABLE ENCLOSURE

[75] Inventors: George Debortoli, Ottawa; Brian T. Osborne, Kanata; Helmut H. Lukas, Carleton Place; Jaroslav M. Hvezda, Nepean, all of Canada

[73] Assignee: Northern Telecom Limited, Montreal, Canada

[21] Appl. No.: 587,161

[22] Filed: Jan. 16, 1996

Related U.S. Application Data

[63] Continuation of Ser. No. 163,633, Dec. 9, 1993, abandoned.
[51] Int. Cl.$^6$ ..................................................... G02B 6/00
[52] U.S. Cl. ........................... 385/135; 385/134; 385/136; 385/137
[58] Field of Search ................................... 385/54, 55, 59, 385/60, 71, 76, 77, 88, 92, 100, 106, 109, 110, 134, 135, 136, 137

[56] References Cited

U.S. PATENT DOCUMENTS

| | | | |
|---|---|---|---|
| 4,196,965 | 4/1980 | Matsuno | 385/98 |
| 5,185,840 | 2/1993 | Iapicco | 385/100 |
| 5,185,845 | 2/1993 | Jones | 385/135 |
| 5,189,725 | 2/1993 | Bensel, III et al. | 385/135 |
| 5,218,664 | 6/1993 | O'Neill et al. | 385/135 |
| 5,222,179 | 6/1993 | Auteri | 385/114 |
| 5,278,933 | 1/1994 | Hunsinger et al. | 385/135 |
| 5,313,539 | 5/1994 | Ogawa et al. | 385/134 X |
| 5,323,480 | 6/1994 | Mullaney et al. | 385/135 |

*Primary Examiner*—Brian Healy
*Attorney, Agent, or Firm*—R. J. Austin

[57] ABSTRACT

Optical cable enclosure for connecting a supply optical cable to a customer cable having respective storage regions for optical fibers of both cables and an interconnection region for the fibers. The optical fibers of the customer cable extend either to their storage region or to the interconnection region, guide members being positioned for change in direction from one region to the other. The paths of the optical fibers are controlled regardless of their destination to ensure no undue stresses are placed upon the fibers. This control is effected quickly and easily.

20 Claims, 5 Drawing Sheets

OPTICAL FIBER CABLE ENCLOSURE

This application is a continuation of application Ser. No. 08/163,633, filed Dec. 9, 1993, now abandoned.

FIELD OF THE INVENTION

This invention relates to optical cable encloses.

BACKGROUND OF THE INVENTION

In the telecommunications field, cable enclosures for connection of electrical conductors of supply cables either with electrical conductors or other supply cables or with conductors of customer cables are well known. Such enclosures may be used either above or below ground level. However, cable customers are now requiring and are being supplied with optical telecommunications cables, these cables having marked advantages, as is known, over electrical cables. Unfortunately, problems are being encountered in connecting optical supply cables to each other or to customer cables and old established electrical cable enclosure technology does not provide the right solutions. In using the old technology, it is found difficult, if not impossible properly to provide optical fiber interconnections and also to control and organize in required fashion the optical fibers which extend into the enclosures for interconnection.

SUMMARY OF THE INVENTION

The present invention seeks to provide an optical cable enclosure for interconnecting optical fibers and which provides a solution to the above problems.

According to one aspect of the invention there is provided an optical cable enclosure for interconnecting optical fibers of a supply cable to optical fibers of a customer cable comprising:

a housing and an internal structure; an inlet in the housing for the supply cable and a first storage region provided by the internal structure for optical fibers of the supply cable; an inlet in the housing for the customer cable, a second storage region provided by the internal structure, the second storage region for unused optical fibers of the customer cable, and an interconnection region provided by the internal structure for interconnecting optical fibers of the customer cable to optical fibers of the supply cable; and guide means for guiding optical fibers of the customer cable either to the second storage region or to the interconnection region.

With the enclosure according to the invention because the storage regions are provided for the optical fibers and also the interconnection region is provided, cables are easily fitted into the enclosure with optical fibers for the customer cable and which are not at present in use and are controlled by the guide means and stored by the second storage region. Subsequently, when optical fibers of the customer cable are needed to be connected to a supply cable, these fibers are easily moved from their second storage region and again while being controlled by the guide means are guided into the interconnection region for interconnection with the supply cable. Thus, in use of the enclosure according to the invention, the optical fibers of the supply and customer cables extending into the enclosure are controlled in position and location while the optical fibers of the customer cable may be moved between the second storage region and the interconnection region as required.

In a preferred arrangement the enclosure comprises a plurality of fiber holders which may be stacked in a frame with the fiber holders individually movable between operating and access positions and each of the fiber holders has a first storage region for optical fibers of the supply cable and also an interconnection region. The stacking of the holders provides a compact arrangement within the housing of the enclosure and which enables the optical fibers of the supply cable to be dealt with in an orderly fashion.

It is also preferred for the housing to comprise an end plate which defines the inlets and a cover extends across the internal structure which is secured to the end plate. The cover is then movable over the internal structure from a position, in which it surrounds the internal structure and is secured to the end plate, to a position removed from the structure for access to the internal structure. In further preferred arrangements, the frame has a plate extending along one side of the stack of holders and which separates the stack from a passage along which the supply cable is locatable as it extends from its inlet to the first storage region of each of the holders. In these arrangements, the first storage region of the holders is disposed at a remote end of the fiber holders from the end plate of the housing.

In order to control and prevent damage to the optical fibers disposed within the housing, location means is provided in the second storage region for locating a plurality of groups of fibers extending to the second storage region and a location means is also disposed to direct and control the position of the optical fibers of the customer cable extending to the fiber holders which define also the interconnection region.

Ideally, the stack of fiber holders has two ends with the end plate of the housing spaced from one end of the stack and axially aligned with it, the end plate defining the inlets for the cables. Each holder has an entry end nearest the end plate for optical fibers of the customer cable and an entry end at the further end for optical fibers of the supply cable. With the supply cable extending along the passage alongside the stack of holders, fibers of the supply cable extend to the first storage region in each holder by passing through the entry end provided for the purpose. On the other hand the optical fibers of the customer cable extend through the space defined between the end plate and the stack of holders with the guide means locating the fibers in position within this space for directing the fibers either to the second storage region or to the fiber holders as required.

The invention also includes an assembly of an optical cable enclosure according to the invention defined above in combination with a supply cable which extends through and is sealed within the inlet for the supply cable and optical fibers of the supply cable extend to and are stored within the first storage region. With this arrangement, a supply cable may have two inlets with two cable lengths extending one to each inlet and optical fibers of the supply cable extend from one cable length to the other and through the first storage region.

The invention further includes an assembly of optical cable and cable enclosure comprising a housing having an inlet for a supply cable, an inlet for a customer cable, a customer cable extending in sealed relationship through the inlet with optical fibers of the customer cable extending into the enclosure beyond a jacket of the customer cable, a plurality of fiber protective tubes, the fibers being disposed in groups in the protective tubes with the desired quantity of fibers in each group.

BRIEF DESCRIPTION OF THE DRAWINGS

One embodiment of the invention will now be described, by way of example, with reference to the accompanying drawings, in which.

DETAILED DESCRIPTION OF THE PREFERRED EMBODIMENT

Figure 1:
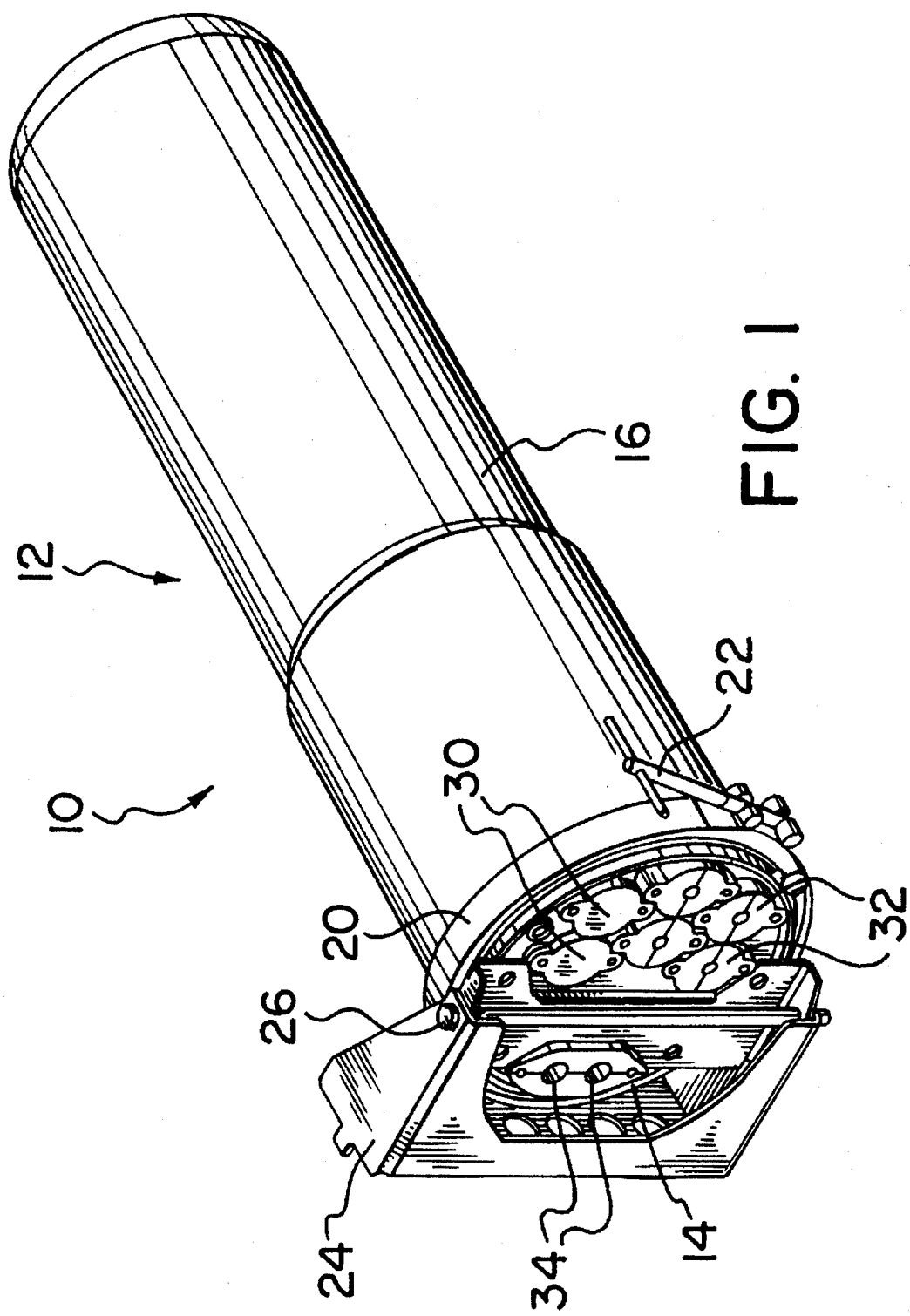
FIG. 1 is an isometric view of an optical cable enclosure.

As shown in FIG. 1, an optical cable enclosure 10 is provided for interconnecting optical fibers of a supply cable to optical fibers of a customer cable. This enclosure 10 comprises a housing 12 including a planar end plate 14 and a cylindrical cover 16. The cover 16 has an open end by which it is secured to the end plate 14 and a closed end 18 at its other end. The cover and end plate are secured together by a band 20 encircling the end plate and cover end, the band being detachably held in position by an over center securing lever device 22. The band is of V-shaped section (not shown in the drawings) which draws the cover and end plate together during closing to compress a seal which is contained between the two parts of the housing. As is shown by FIG. 1 the end plate may be mounted upon a mounting plate 24 to which it is pivotally connected by hinge pin 26 as shown, the mounting plate being instrumental in this embodiment in mounting the enclosure upon a framework in any desired position. End plate 14 has a plurality of inlets for a customer's cable into the enclosure, two of the upper inlets being shown with covers 30 when not in use and the other inlets being shown with a sealing arrangement design having a central orifice 32 for the passage of the customer's cable. The end plate 14 is also provided with two inlets for supply cable which is to be a through cable from one enclosure 10 to another disposed in series along a line, the two inlets being provided close together at position 34 as shown in FIG. 1. It is intended that customers cable and the supply cable will be held within the inlets and in the end plate 14 while being sealed in position by any suitable means. The sealing and securing arrangement for the cables is preferably provided by a structure as described in a patent application recently filed in the United States Patent Office and entitled "Telecommunications Cable Enclosure" by A. Fahim, et al (Applicants' Reference Fahim 1-1-1) or by a structure described in a patent application recently filed at the United States Patent Office entitled "Telecommunication Cable Enclosure" by M. Tenace, et al (Applicants' Reference Tenace 2-31).

Figure 2:
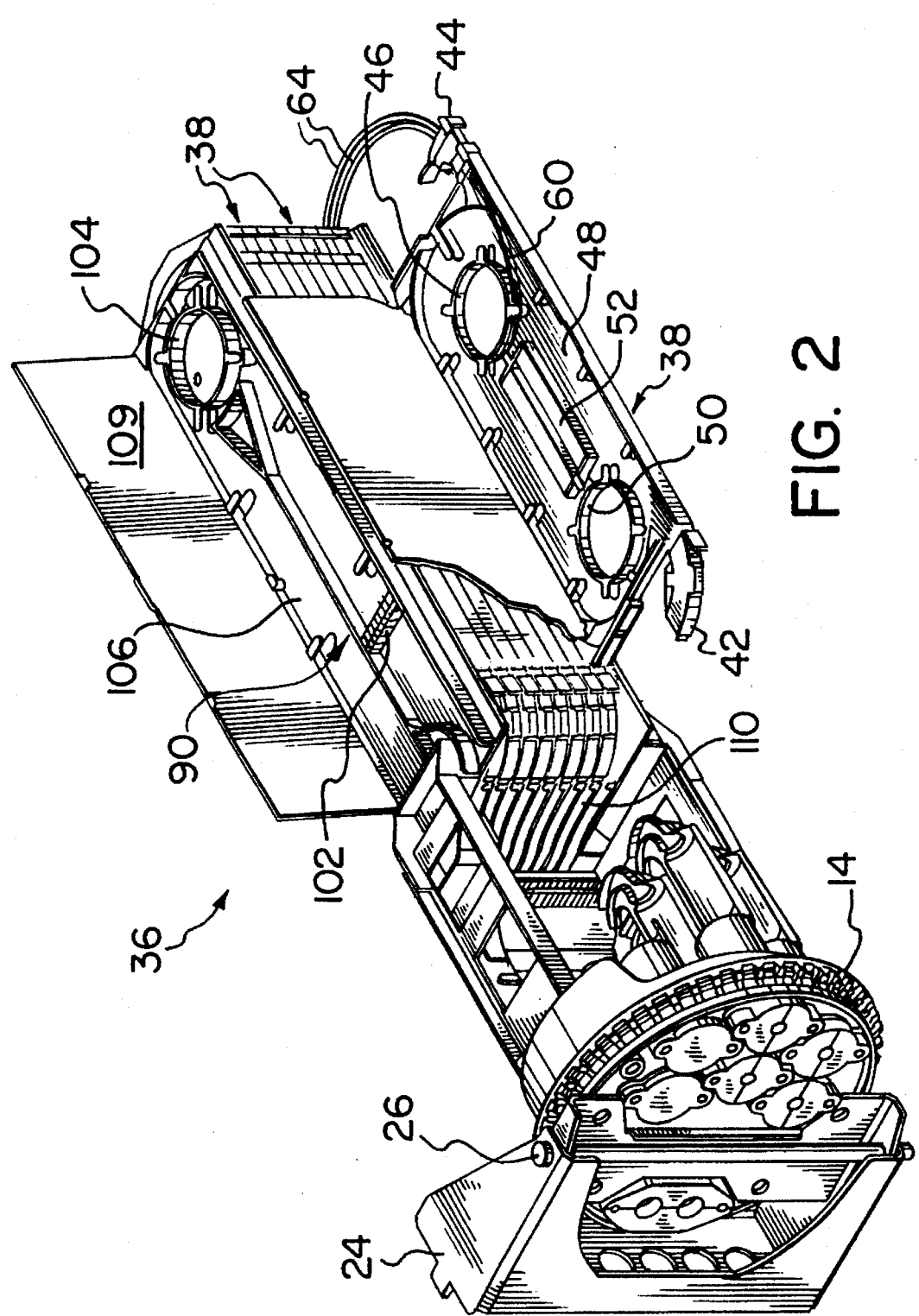
FIG. 2 is a view similar to FIG. 1 of the enclosure with a cover of a housing of the enclosure removed.

Inside the cover 16 is provided an internal structure 36. As shown by FIG. 2, the internal structure comprises a plurality of optical fiber holders 38 which are in stacked formation within the enclosure, each of the fiber holders being movable from operating positions within the stack within a frame 40 (see FIG. 5) by a sliding movement to make the holders accessible to a cable installer or maintenance engineer. In the access position, any of the trays may be caused to be individually forwardly of the stacked position, for instance as shown by the outwardly positioned holder in FIGS. 2, 3 and 5.

The fiber holders 38 lie axially spaced from the end plate 14 with each holder being elongate as shown in FIG. 2 and having one end towards the end plate 14 and another end further from the end plate. At the end nearer the end plate, each of the fiber holders 38 is provided with a curved guide 42 for optical fibers passing from a customers cable as will be described, and at the other end a similarly curved guide 44 is provided for guiding optical fibers of the supply cable into the holder.

At the end region of each fiber holder furthest from the end plate 14 is disposed a storage region for optical fibers of the supply cable. This storage region is provided around a short cylindrical member 46 which extends upwardly from a planar plate 48 forming the basis of the holder. The cylindrical member 46 is provided for wrapping around it the optical fibers and has such a diameter as to ensure that the radius of the fibers cannot lie within a minimum which could enhance attenuation of the signals or otherwise deleteriously affect the fibers. At the other end region of each holder 38 is disposed another cylindrical member 50 of similar construction to the cylindrical member 46, the member 50 being provided for wrapping around it the excess fibers of customer cables which are brought to the enclosure. Between the two cylindrical members 46 and 50 is disposed an interconnection region for the fibers of the customer and supply cables, the interconnection region comprising a splicing block 52 suitable for optical-fiber connection.

Figure 3:
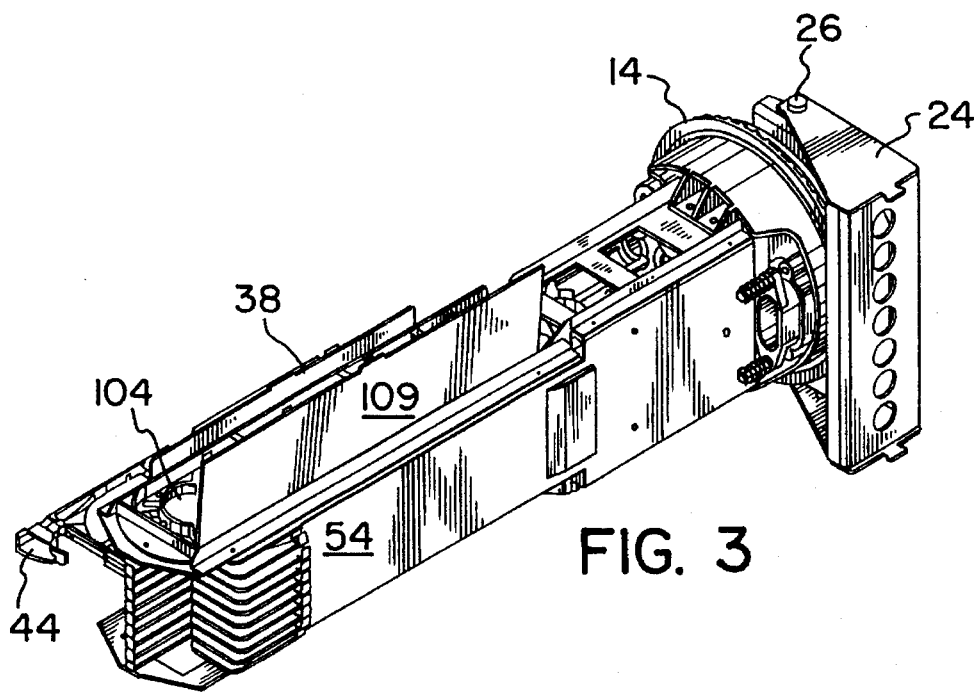
FIG. 3 is an isometric view from the other end of the enclosure and with the cover removed.
Figure 4:
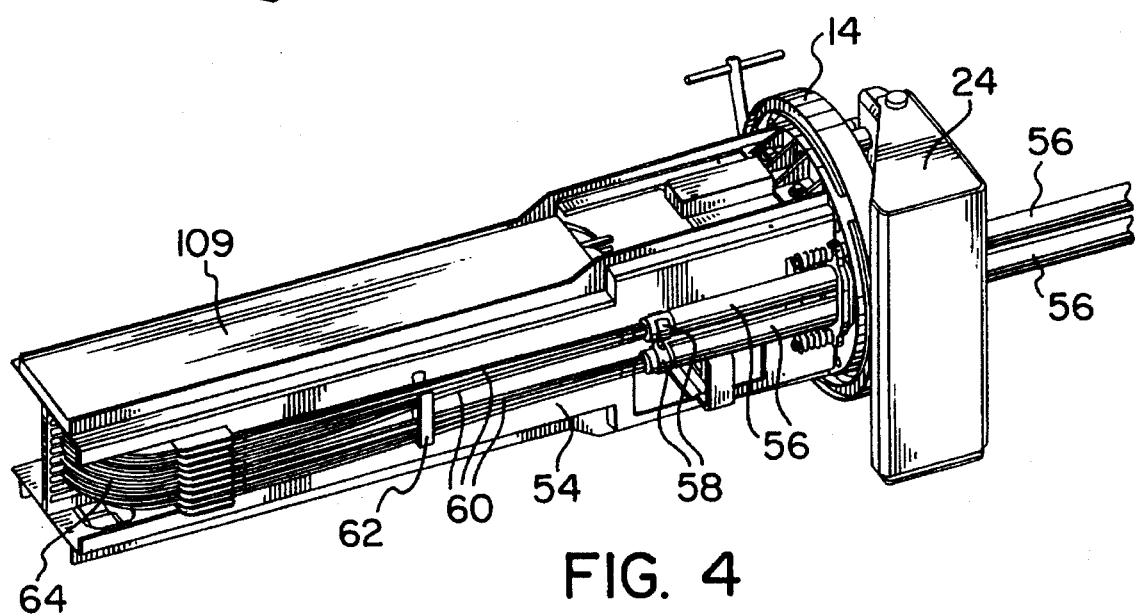
FIG. 4 is a view similar to FIG. 3 and showing a supply cable in position into the enclosure.

As shown by FIG. 3, rearwardly of the stack of holders 38, i.e. in a direction opposite to the movement of the holders into their access positions, is provided a longitudinally extending plate 54 of the structure, the plate separating the stack of holders 38 from a passage which is defined between the plate and the cover 16 of the housing when this is in position. The passage is for containing the supply cable and optical fibers fed from the supply cable as shown in FIG. 4 when the supply cable is fitted. The supply cable has two cable lengths 56 extending and sealed into the inlets 34 as shown in FIG. 4, the cable jacket and sheath being removed close to the end plate 14 as shown by FIG. 4 and secured in position by securing clips 58 to the plate 54. Optical fibers 60 of the supply cable then extend along the side of the plate 54 within the defined passage and are held in position such as by a mounting bracket 62 before passing around the end of the plate 54 and being distributed to the various holders 38 by passage through the fiber guides 44 shown in FIG. 2. To protect the fibers extending from the plate 54 to the fiber guides 44, the fibers may be grouped in tubes 64 (FIGS. 2 and 4) which extend into the guides 44 and are secured in position as they emerge onto the holders 38 from the guides. The fibers 60 then extend as excess lengths for storage around the cylindrical members 46 from one cable length to the other of the supply cable so that the two cable lengths shown in FIG. 4 have common optical fibers extending from one length to the other. The position of the supply cable and its optical fibers is then preparatory for use for connection to a customers cable to be fitted later to the enclosure when required.

Figure 5:
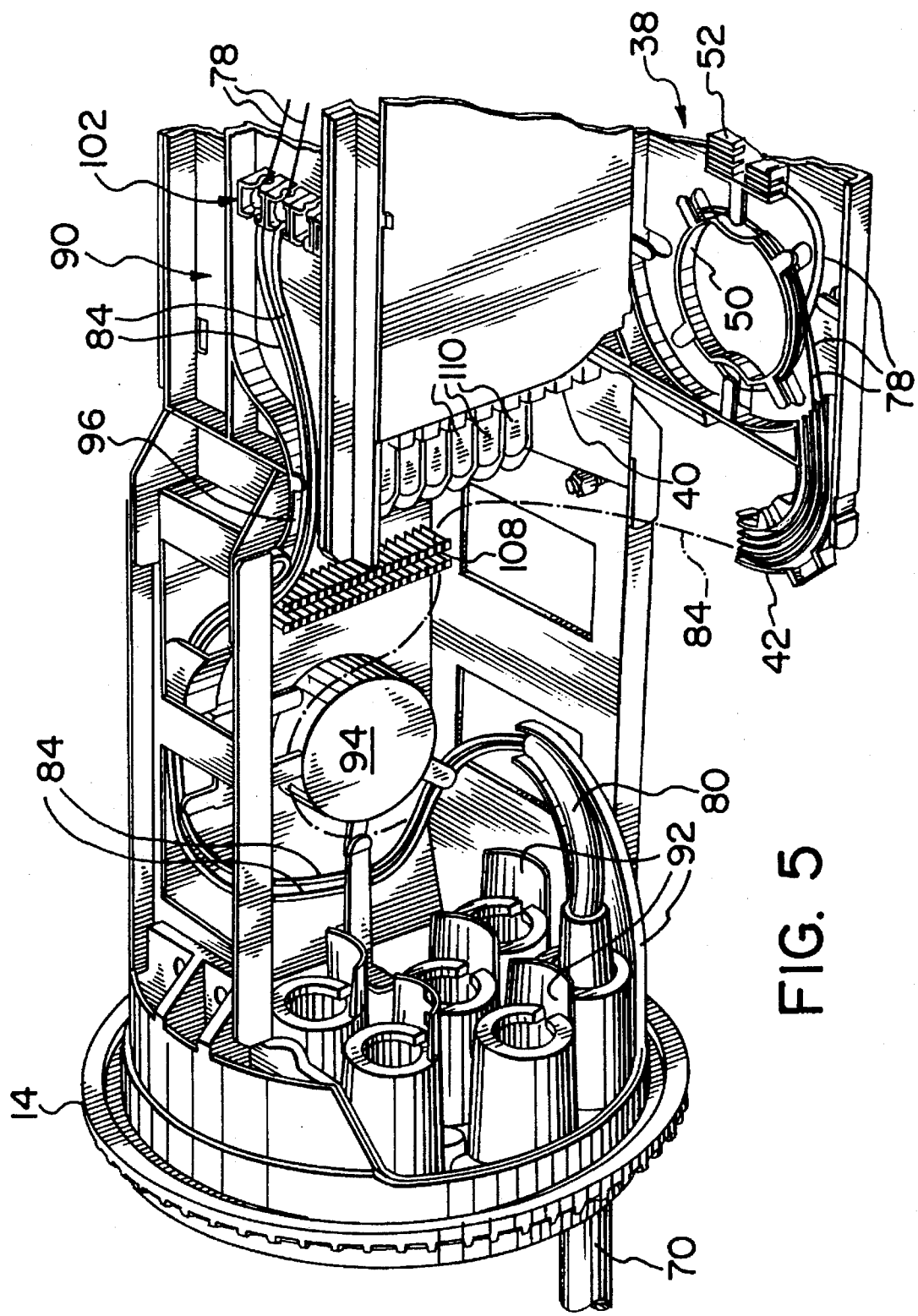
FIG. 5 is an isometric view of one end of the enclosure and to a larger scale to show details.
Figure 6:
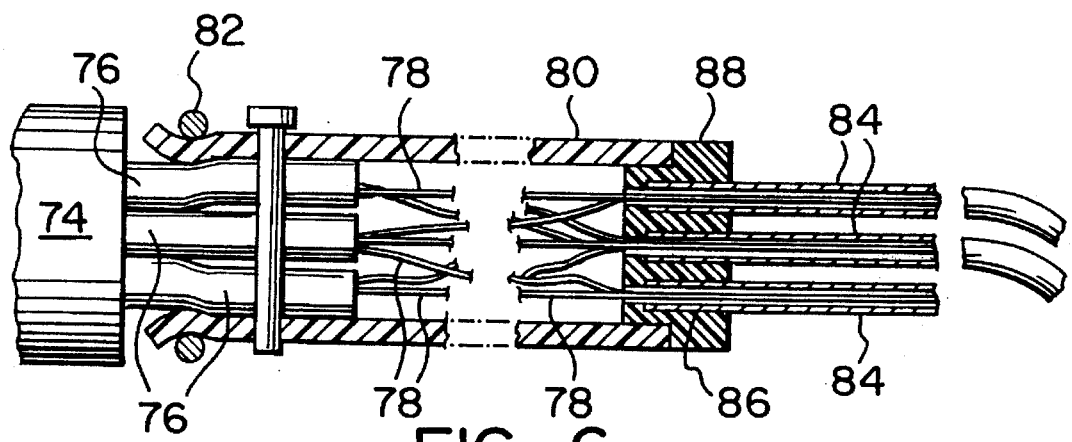
FIG. 6 is a side elevational view partly in section, showing a detail near the entry of the cable into the enclosure and to a much larger scale.

As may be seen from the above description, therefore, the enclosure of the embodiment enables a supply cable to be passed into the enclosure with its optical fibers controlled as required in the various fiber holders in readiness for interconnection with optical fibers of a customers cable. As may also be seen from the above description, a specific pathway or passage is provided for the supply cable and its optical fibers to ensure that the supply optical fibers are disposed at one end of the holders 38 while the fibers of the customers cables are disposed at the other ends of the holders as will be described. Thus, the enclosure 10 may be positioned in any desired location and fitted to a supply cable which may pass through the enclosure as shown from one enclosure to another, the enclosure being in readiness for use with any customers cable with which it is required to be used, and as will be seen, the optical fibers are easily and quickly connected to any customers optical fibers as desired extremely quickly, easily and efficiently. As shown by FIGS. 5 and 6, when a customer cable 70 extends through the end plate 14 it passes through a seal arrangement (not shown) such as discussed above and as described in the aforementioned patent applications, for sealing the outside surface of the jacket to the end plate 14. Subsequently, tubes 76 of the cable and containing groups of optical fibers 78 of the cable 70 pass through a region 74 which provides a further seal around the tubes to prevent ingress of moisture into the enclosure, the moisture passing along the inside of the cable as distinct from the outside.

As shown also in FIG. 6, for any customer cable 70 installed in the enclosure the tubes 76 of the cable extend beyond the region 74 for a short distance and the optical fibers 78 extend outwardly beyond the tube 76 for sufficient distances for their purposes as will be described. While it is possible for the fibers 78 to be contained within the tube 76 for use within the enclosure 10, with such an arrangement, whenever a tube 76 of fibers is connected with the supply cable in any of the trays 38, then it may be found that the fibers in that particular tube may be too many in quantity for the specific requirements of the customer. For instance, if a large building is to be supplied with cable then perhaps the whole of the cable 70 is sufficient for its purposes. However, the cable 70 may extend from the enclosure 10 to a distribution enclosure (not shown) to distribute customer service to two or more premises. Should it be required to pass any of the fibers 78 to a normal household where only two or three optical fibers are required, wastage may result if all of the tubes 76 are found to contain more than two fibers, e.g. six, eight or ten fibers.

To adapt the cable 70 to any particular requirements within the enclosure, as already stated the tubes 76 terminate a short distance beyond the sealing region 74. A substantially cylindrical protective shroud or tube 80 is then positioned over the fibers 78 and around the ends of the tubes 76, the tube 80 extending for a short distance away from the sealing region 74. The one end of the shroud 80 is then secured to the tubes for instance with the use of a tie wrap 82 as shown in FIG. 6 so that the fibers 78 extend outwardly from the tube ends 76 within the shroud and are completely free from one another. This individual freedom of the fibers then enables the fibers to be repositioned in groups which are different from the groups in which they were originally located within the tubes 76 of the cable 70. Hence, groupings of fibers may be made in any quantity which may be greater or lesser than the grouping numbers within the tubes 76. Thus, if there were for instance either eight or ten fibers in each group in the tube 76, the fibers may now be disposed in groups of two, four, six or any other amount of fibers as may be required in the area in which the enclosure 10 and the cable 70 is located. This required grouping of fibers into different specific numbers is accommodated by providing a plurality of fiber protective tubes 84 (see particularly FIG. 6). Each of these tubes 84 has one end mounted within an individual bore 86 of a plug 88 which is mounted at the other end of the tube 80. Thus the tubes 84 extend away from the tube 80, different tubes containing different amounts of fibers in their various groups as is required. The tubes 84 containing the customer optical fibers 78 are then passed, when not in use, to a storage region 90 which lies in a plane normal to the plane of the plate 54 and, as shown in FIG. 2, lies at the top of the stack of holders 38. A guide means is provided for guiding the tubes 84 to the storage region 90, the guide means comprising a curved shoe 92 extending away from the end plate 14 to direct the fibers 78 from each cable between guide surfaces of the guide means (FIG. 5). One shoe 92 only is shown in its entirety, the other guide shoes being cut short for clarity. Conveniently, as shown in FIG. 5, the tube 80 is disposed within the curved shoe 92 because the tube 80 with the free fibers 78 is particularly flexible. The guide surfaces guide the tubes 84 into an entrance 96 to one end of the storage region 90.

Figure 7:
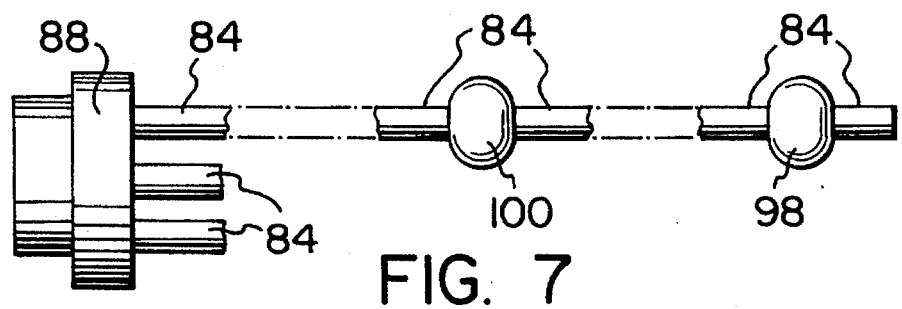
FIG. 7 is a longitudinal view to the scale of FIG. 6 of a tube within the enclosure for containing fibers.
Figure 8:
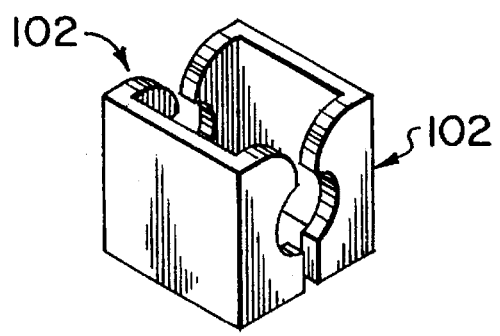
FIG. 8 to the scale of FIG. 6 is part of a location means of the enclosure for retaining the tube of FIG. 8 in a desired position.

It is desired that each of the protective tubes 84 should be disposed substantially along a desired path as it extends from the plug 88 to the storage region 90. This objective is performed by ensuring that a specific part of the length of each tube 84 is disposed in a particular position in the storage region 90. As may be seen from FIG. 7, each of the tubes 84 is provided at its further end with a rubber or other elastomeric annular element 98 secured to it around its periphery. Another similar elastomeric member 100 is secured in a position intermediate the ends of the tube so as to also control the path of the tube as it passes to the holders 38 as will be described. As shown by the enlarged view of FIG. 8, within the station 90 is disposed a location means for engaging the registration elements 98. The location means for each cable comprises two pairs of resiliently movable gripping jaws 102 which are aligned and are spaced apart for acceptance of the tube 84 at two spaced positions. Insertion of the tube between the two pairs of jaws 102 locates the tube in position and with the registration element 94 disposed between one pair and another of the plug 88 to the jaws 102. As shown in FIG. 5, the tubes 84 disposed in the storage region 90 terminate at the jaws 102 and the optical fibers 78 extend outwardly beyond the tubes to pass around a cylindrical member 104 (FIG. 2) similar to the members 46 and 50 so as to accommodate the lengths of the fibers, the ends of the fibers then being disposed along a further arm 106 of the storage region.

when it is desired to connect any of the fibers 78 to a customers premises, a tube 84 having the desired number of optical fibers is chosen and is removed from the jaws 102 thereby removing the fibers 76 from the storage region 90. As is indicated by FIG. 5, the chosen tube 84 is then moved from between the planar guide surfaces which direct it to the storage region 90 and is brought down around a minimum bend radius surface of a cylindrical member 94 to be passed along a new path (chain-dotted in FIG. 5) to a chosen fiber holder 38 for connection to the supply cable. A further location means is provided to control the path of each tube 84 as it extends to a chosen fiber holder 38. This location means comprises a vertically extending elongate member 108 which has two pairs of jaws (not shown in detail) which are similar to the jaws 102 in the storage region 90, and with the tube 84 held between a specific pair of jaws, the registration element 100 is disposed between them as shown for instance by FIG. 5. Thus, the length of the tube between the element 100 and the plug 88 is definite and controls the actual path of the tube. The tube is then moved into the entry 42 of the chosen holder 38 and the end of the tube is secured in position as it enters into the holder. The fibers 78 are then caused to extend around the cylindrical member 50 to take up their excess lengths and the fiber ends are brought into the splicing block 52 to be connected to fibers of the supply cable and which are around the cylindrical member 46 of the holder 38. For this purpose, certain of the optical fibers 60 of the supply cable are severed to provide ends suitable for connection to the fibers 76.

As may be seen therefore, the enclosure also is constructed to enable a customers cable to be brought into the enclosure and the fiber positions managed and controlled with complete protection being given to the fibers before being required for use and also during use. In particular, before certain fibers of the customers cable are placed in a condition of use, they are contained by the tubes 84 and are directed towards the storage region 90 which affords them complete protection within the cover 16, the storage region 90 also being provided with its own cover 109. When it is required to connect any of the fibers 78 to fibers of the supply cable, the chosen tube 84 having the requisite number of fibers is then easily redirected from the storage region 90 and around the guide means of the enclosure to bring the tube to the entry 42 of the chosen holder 38 which is then disposed in the access position for instance as shown in FIGS. 2 and 5. Interconnections between the fibers of the supply and customer cables are then easily made in the splice block 52. The holder 38 is then slid back into its operative position in the stack of holders, and this movement causes the tube 84 to slide between spaced apart guide plates 110 which extend towards the end cover 14 from the frame 40 so as to provide further protection to the tube and fibers.

It is clear from the above description, that in the embodiment there is provided an enclosure which provides complete protection and management of optical fibers while enabling a supply cable to be located within the enclose in preparation for connection to a customers cable. The enclosure also enables optical fibers of a customer cable to be stored in one location preparatory for use and then to be located in a different position for connection to the fibers of the supply cable. The enclosure therefore provides a system in which the optical fibers which are not in use are disposed in readiness in orderly fashion to be placed in use efficiently and quickly and without causing damage to fibers.

What is claimed is:

1. An optical cable enclosure for interconnecting optical fibers of a supply cable to optical fibers of a customer cable comprising:

a housing and an internal structure;

an inlet in the housing for the supply cable and a first storage region provided by the structure for optical fibers of the supply cable;

an inlet in the housing for the customer cable, a second storage region provided by the structure, the second storage region for unused optical fibers of the customer cable, and an interconnection region provided by the internal structure for interconnecting optical fibers of the customer cable to optical fibers of the supply cable;

the housing comprising an end plate which defines the inlets for the supply and customer cables, and a cover, the internal structure being secured to the end plate, and the cover being movable over the internal structure between a position around the internal structure and sealed to the end plate and a position removed from the internal structure for access to the internal structure;

and guide means defining two paths each of which extend from the customer cable inlet and diverge with one of the paths leading to the second storage region for guiding optical fibers of the customer cable to the second storage region and the other of the paths leading to the interconnection region for guiding optical fibers of the customer cable to the interconnection region.

2. A cable enclosure according to claim 1 comprising a plurality of fiber holders individually movable between an operating and access positions, each fiber holder having a first storage region and an interconnection region.

3. A cable enclosure according to claim 2 wherein the plurality of fiber holders in their operating positions are stacked in a frame and are movable out of the stack and into their access positions.

4. A cable enclosure according to claim 3 wherein each holder is slidable into and out of its operating position.

5. A cable enclosure according to claim 3 wherein the frame has a plate extending along one side of the stack, the plate separating the stack from a passage extending from the inlet for the supply cable for location of optical fibers from the supply cable past one end of the holders, along the side of the stack and to an entrance to the first storage region disposed at the other end of each fiber holder.

6. A cable enclosure according to claim 3 wherein in the second storage region there are provided a plurality of location means for locating a plurality of groups of fibers in the second storage region.

7. A cable enclosure according to claim 6 wherein each location means is resilient to enable it to be resiliently opened to resiliently hold a tube extending from the customer cable, the tube containing a group of fibers.

8. A cable enclosure according to claim 7 provided with another plurality of resilient location means disposed along a path between the inlet for the customer cable to the stack of fiber holders, for alternatively holding a tube of the customer cable in one of either plurality of resilient location means.

9. A cable enclosure according to claim 8 wherein the other plurality of resilient location means are provided in series along an elongate member which locates each of its location means for directing a tube towards an individual fiber holder.

10. A cable enclosure according to claim 3 wherein the stack of fiber holders has two ends, the end plate is spaced from one end of the stack, each holder having an entry end nearest the end plate for optical fibers of the customer cable and an entry end furthest from the end plate for optical fibers of the supply cable, a passage defined at one side of the stack of holders for optical fibers of the supply cable to the entry end of each holder furthest from the end plate, each holder provided with a first storage region adjacent the entry end furthest from the end plate and also having an interconnection position.

11. A cable enclosure according to claim 10 wherein each holder has an excess fiber control region adjacent the end of the holder nearest the end plate.

12. A cable enclosure according to claim 10 wherein the end plate is axially in line with the ends of the holders nearest the end plate with a space provided between the end plate and the nearest ends of the holders and with the second storage position extending along one side of the stack of holders and away from the end plate, and the guide means is located in the space between the end plate and the ends of the holders.

13. An assembly of optical cables and an optical cable enclosure for interconnecting a supply cable to optical fibers of a customer cable wherein the enclosure comprises:

a housing and an internal structure;

an inlet in the housing for the supply cable and a first storage region provided by the internal structure for optical fibers of the supply cable;

an inlet in the housing for the customer cable, a second storage region provided by the internal structure, the second storage region for unused optical fibers of the customer cable, and an interconnection region provided by the internal structure for interconnecting optical fibers of the customer cable to optical fibers of the supply cable;

and guide means defining two paths each of which extend from the customer cable inlet and diverge with one of the paths leading to the second storage region for guiding optical fibers of the customer cable to the second storage region, and the other of the paths leading to the interconnection region for guiding optical fibers of the customer cable to the interconnection region;

and the optical cables comprise:

a supply cable extending through the supply cable inlet with some of the optical fibers of the supply cable extending to the interconnection region and other optical fibers of the supply cable extending to the first storage region; and a customer cable extending through the customer cable inlet with some of the optical fibers of the customer cable extending along the one path to the interconnection region and interconnected to optical fibers of the supply cable and other optical fibers of the customer cable extending along the other path to the second storage region while diverging from the fibers of the customer cable extending to the interconnection region.

14. An assembly according to claim 13 wherein there are two inlets for the supply cable, the supply cable having cable lengths extending into both inlets and optical fibers of the supply cable extend from one cable length to the other and through the first storage region.

15. An assembly according to claim 13 wherein the optical fiber holders are disposed in a stack in the frame and have a first storage region and an interconnection region and the optical fibers of the supply cable extend to the first storage regions of the holders.

16. An assembly according to claim 15 wherein the stack of fibers has two ends, the housing has an end plate spaced from one end of the stack, the end plate defining the inlets, each holder having an entry end nearest the end plate for optical fibers of the customer cable and an entry end furthest from the end plate for optical fibers of the supply cable, a passage defined at one side of the stack of holders for optical fibers of the supply cable to the entry end of each holder furthest from the end plate, each holder provided with a first storage region adjacent the entry end furthest from the end plate and also with an interconnection position, and optical fibers of the supply cable extend from its inlet along the passage and through the entry ends of the holders furthest from the end plate to the first storage positions of the holders and the customer cable extends through its inlet, optical fibers of the customer cable guided by the guide means either to the second storage position or to an excess fiber control region adjacent the nearest end of one at least of the holders, the customer and supply cable optical fibers extending to and being interconnected at the interconnection position of said at least one holder.

17. An assembly according to claim 15 wherein optical fibers from the customer cable are disposed in groups within tubes to extend each group of fibers either to the second storage region or to the excess fiber control region.

18. An assembly according to claim 17 wherein a tube location means is provided for the second storage region and also for the holders and each tube is of specific length and has tube control means for disposing the tube precisely with a specific longitudinal region of the tube held by one location means or the other location means so as to control the path of the tube when it is passing either to the second storage region or to its individual holder.

19. An assembly according to claim 18 wherein the tube control means comprises at least one registration element extending outwards from the tube for registration with one or other of the location means.

20. An assembly according to claim 19 wherein each location means comprises two resilient spaced gripping members and the registration element is disposable between the gripping members with the tube held by the location means to at least restrict longitudinal movement of the tube.

* * * * *